United States Patent
Höhne et al.

(10) Patent No.: US 6,346,137 B1
(45) Date of Patent: Feb. 12, 2002

(54) ULTRAFINE COBALT METAL POWDER, PROCESS FOR THE PRODUCTION THEREOF AND USE OF THE COBALT METAL POWDER AND OF COBALT CARBONATE

(75) Inventors: Matthias Höhne, Clausthal-Zellerfeld; Bernd Mende, Bad Harzburg; Knut Eikemeyer, Altenau, all of (DE)

(73) Assignee: H. C. Starck GmbH & Co. KG, Goslar (DE)

( * ) Notice: Subject to any disclaimer, the term of this patent is extended or adjusted under 35 U.S.C. 154(b) by 0 days.

(21) Appl. No.: 09/141,973

(22) Filed: Aug. 28, 1998

Related U.S. Application Data

(62) Division of application No. 08/728,833, filed on Oct. 10, 1996, now abandoned.

(30) Foreign Application Priority Data

Oct. 27, 1995 (DE) .......................................... 195 40 076

(51) Int. Cl.[7] .................................................. B22F 9/24

(52) U.S. Cl. ................................ 75/374; 75/365; 75/369
(58) Field of Search ........................... 75/365, 369, 374

(56) References Cited

U.S. PATENT DOCUMENTS 4,093,450 A * 6/1978 Doyle et al.
6,015,447 A * 1/2000 Gorge et al. .................. 75/255
6,019,813 A * 2/2000 Gorge et al. .................. 75/255

* cited by examiner

*Primary Examiner*—John Sheehan
(74) *Attorney, Agent, or Firm*—Joseph C. Gil; Diderico van Eyl

(57) ABSTRACT

Ultrafine cobalt metal powder consisting of fine crystallites, wherein the crystallites, wherein the crystallitex exhibit a rice-grain shaped to spherical habit and more than 90% of the crystallites have a diameter in the range of from 0.5 to 2 μm, a process for the production of the cobalt metal powder via an intermediate stage of cobalt carbonate production, and processes and products re certain uses of the cobalt metal powder and the cobalt carbonate and an intermediate oxide so produced.

8 Claims, 1 Drawing Sheet

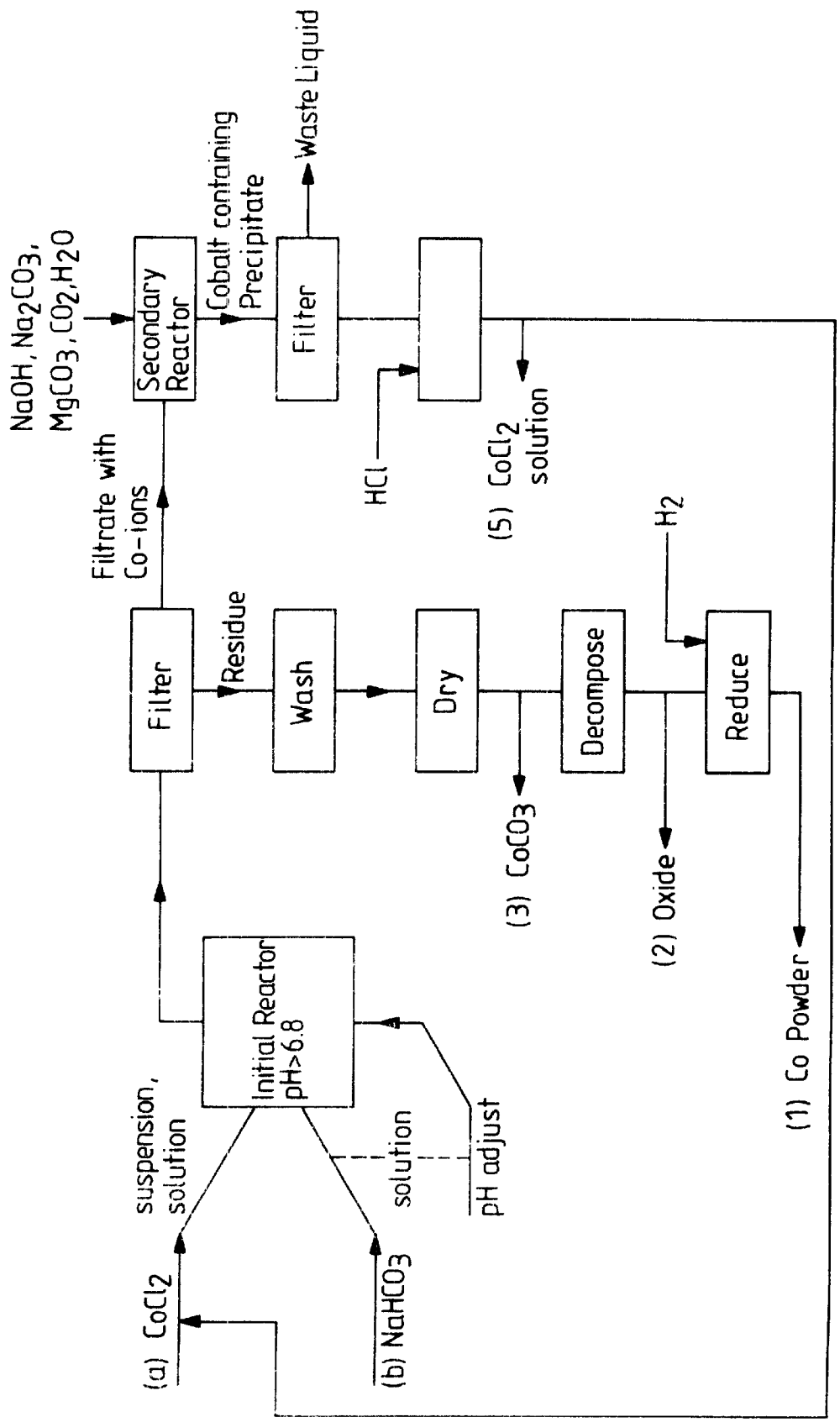

ULTRAFINE COBALT METAL POWDER, PROCESS FOR THE PRODUCTION THEREOF AND USE OF THE COBALT METAL POWDER AND OF COBALT CARBONATE

This application is a division of application Ser. No. 08/728,833 filed Oct. 10, 1996, now abandoned.

BACKGROUND OF THE INVENTION

The present invention relates to ultrafine cobalt metal powder consisting of fine crystallites, wherein the crystallites exhibit a habit ranging from rice-grain shaped to spherical and more than 90% of the crystallites have a diameter in the range of from 0.5 μm to 2 μm, a process for the production of the cobalt metal powder via the intermediate stage of the cobalt carbonate, and methods for the use of the cobalt metal powder and of the cobalt carbonate.

The main fields of application of ultrafine cobalt metal powder are the production of hard metals and of diamond tools. The two applications place different demands on the cobalt metal powder. For use in hard metals, a very low content of impurities such as sodium, calcium and sulphur is particularly important. It is also important that the content of oxygen and carbon is not too high. The particle size and particle shape are of secondary importance.

To produce hard metals, mainly mixtures of tungsten carbide and of about 6 to 15% of cobalt metal powder are sintered at temperatures of about 1350 to 1450° C. This is a liquid phase sintering of the cobalt metal powder, during which part of the tungsten carbide dissolves in the cobalt. On cooling, recrystallization processes take place in the course of which small quantities of impurities such as sodium (Na), calcium (Ca) and sulphur (S) contained in the starting materials are already deposited preferentially at the grain boundaries of the tungsten carbide crystals. This can lead to a local reduction in strength and hence to a decrease in bending strength (12th International Plansee Seminar '89, Vol. 2 (pages 421–428)). In the case of very fine hard metal parts such as, for example, microbores, this effect results in the tools readily breaking at the positions of decreased strength.

It is also important that the content of oxygen and carbon is not too high, with values to a total of up to 0.9 wt % being acceptable. Both an increased oxygen content and an increased carbon content can influence the carbon balance during the sintering process, so that the development of embrittlement through etaphasis or through formation of C-porosity owing to carbon esters may possibly result. The two effects also distinctly impair the quality of the hard metal.

In the production of diamond tools based on cobalt metal powder, which tools consist mainly of cobalt metal powder, synthetic diamonds and other powdered substances, for example, copper, tin, iron, nickel, etc. the influence of the physical properties such as particle size and particle shape quite definitely dominates. Although the chemical impurities in the above-mentioned elements can give rise to a microporosity, this is only a minor factor. The reason for this lies in the temperature range of 700 to 950° C. conventionally employed in the production of diamond tools. In contrast to the production of hard metals, at these temperatures solid phase sintering occurs, so that the properties of the initial powders are predominantly preserved.

Experimentally it is observed that a decrease in the particle size gives rise to an increase in the hardness of hot-pressed cobalt segments. In general the Hall-Petch equation states that the hardness is reciprocal to the square root of the medium particle diameter.

This relation can be explained theoretically by the fact that the hardness is influenced by the specific proportion of grain boundaries per unit of volume, since the grain boundaries impede the propagation of dislocations. As the hardness correlates with the cutting properties of the segments, an increase in hardness frequently results in tools having a longer useful life and is therefore of great importance. In order to increase the specific proportion of grain boundaries per unit of volume, the primary particle size of the powders can be decreased (J. Konstanty and A. Busch in PMI, Vol. 23, No. 6, (1991)). Another possible method of increasing the specific proportion of grain boundaries per unit of volume consists however, at an identical or similar particle size, in altering the particle shape in such a way that the primary crystals have more of a rounded habit.

There are a number of different ultrafine cobalt metal powders which to varying degrees fulfil the requirements of manufacturers of hard metals or of diamond tools.

EP-A 0 113 281, owned by the firm Eurotungstene, Grenoble, France, describes the production of cobalt metal powder by the polyol process, whereby different cobalt compounds are reduced by polyols at 85° C. This cobalt metal powder may contain up to 3 wt. % of carbon and oxygen, so that at the otherwise high chemical purity and the high specific proportion of grain boundaries per unit of volume, effected by the particle shape, an adverse influence on the hard metal properties cannot be excluded.

The commercial cobalt metal powder product Co UF from the firm Eurotungstene, according to technical information supplied by the company, is manufactured from cobalt hydroxides. This product is distinguished by a relatively high specific proportion of grain boundaries per unit of volume. However, the increased content of sodium and sulphur can be disadvantageous.

A completely different technical procedure is disclosed in U.S. Pat. No. 5,246,481, owned by the firm Sherritt Gordon, Alberta, Canada. Here the production of this powder is carried out through the reduction of cobaltammine sulphate solutions, to which have been added soluble silver salts as nucleating agents. The doping with silver salts can lead to exceptionally high contents of silver, typically of up to 3,600 ppm, in the cobalt metal powder. Furthermore the carbon content, which according to information from the company is about 1,750 ppm, is remarkable.

The principal object of the present invention is to provide a cobalt metal powder which does not possess the disadvantages of the powders described above.

SUMMARY OF THE INVENTION

There has now been found a cobalt metal powder which possesses the required properties. The present invention provides an ultrafine cobalt metal powder consisting of fine crystallites, wherein the crystallites exhibit a habit ranging from rice-grain shaped to spherical and more than 90% of the crystallites have a diameter in the range of from 0.5 μm to 2 μm, characterised in that it has a sodium content of less than 100 ppm and a carbon content of less than 500 ppm.

Preferably the content of sodium is less than 50 ppm and that of calcium and sulphur respectively is less than 30 ppm.

In an additional preferred embodiment, more than 90% of the crystallites have a length to width ratio in the range of from 1:1 to 5:1, while the diameter of the crystallites is preferably from 0.7 μm to 1.1 μm. The particle size of the crystallites, measured in accordance with ASTM B 330, is preferably from 0.7 μm to 0.95 μm.

Table 1 below provides a survey of the ultrafine cobalt metal powder according to the invention compared with various commercial products.

TABLE 1

Survey of various ultrafine cobalt metal powders

| Manufacturer | HCST | H. C. Starck GmbH | Euro-tungstene | Euro-tungstene | Sherritt Gordon | Sumitomo |
|---|---|---|---|---|---|---|
| Product | Product according to the invention | Co IV C Commercial product | Co UF | Co ex Polyol | Co UF | |
| Particle size FSSS/μm | 0.7–0.95 | >0.95 | 0.9 | 0.5 | 0.7–0.9 | 0.8–1.9 |
| Habit | rice-grain to spherical habit | ellipsoidat habit | spheroidal with rounded crystal surfaces | spherical | spherical | oblong crystals |
| Typical inpurities | | | | | | |
| Na (ppm) | 50 | 60 | 240 | 5 | 20–90 | 130–150 |
| Ca (ppm) | 30 | 40 | 8 | 6 | 6 | 70–80 |
| S (ppm) | 30 | 35 | 140 | 20 | 50 | ** |
| C (ppm) | <500 | <500 | <500 | 2000 | 1750 | ** |
| C + O$_2$ (art %) | 0.8 | 0.8 | 0.9 | 3–4 | 0.9 | ** |

*Due to the production process, this grade of Co has Ag contents of up to 3,600 ppm, which is exceptionally high for Co metal powders.
**The relevant information is not given in the patent specification.

Compared with the commercial product Co IV C from HCST (Hermann C. Starck, GmbH & Co. KG, Goslar) the new product according to the invention exhibits a further increase in purity and again an increased specific proportion of grain boundaries per unit of volume due to a rice-grain shaped to spherical habit. In addition, in a preferred embodiment the product according to the invention has particle sizes of from 0.7 to 0.95 μm, measured in accordance with ASTM B 330, whereas in the commercial product Co IV C these are larger than 0.95 μm.

The present invention also provides a process for the production of the new cobalt metal powder. This is a process for the production of cobalt metal powder in which a soluble cobalt salt is reacted with a liquefied form such as a solution and/or suspension, of alkali carbonate, alkaline-earth carbonate, cobalt carbonate and/or ammonium carbonate and/or the respective hydrogen carbonates, in the pH range of from 5.5 to 6.8, the precipitate formed is separated off, washed with water until the required purity is attained, dried and the cobalt carbonate thus obtained is reduced to the cobalt metal powder.

A process for the production of cobalt metal powder via the intermediate stage of the cobalt carbonate is also disclosed in the Japanese patent application JP-A 78 123 722, owned by the firm Sumitomo, Japan. Owing to the processing conditions thereof, the said process leads to powders of a completely different morphology compared with that of the powders obtained by the process according to the invention.

The crystals obtained according to JP-A 78 123 722 preferably have a diameter of 1 to 2 μm on average and a length equal to 10 to 20 times the diameter. This indicates, however, a low specific proportion of grain boundaries per unit of volume and consequently a lower hardness as well.

In the process according to JP-A 78 123 722, the reaction of the cobalt salts to form cobalt carbonate is carried out at pH values in the range of from 7.0 to 7.4. In reactions within this pH range the Co ions present in the solution are precipitated quantitatively. A disadvantage, however, is that there is a decline in the effectiveness with which the precipitate can be washed, which leads to the increased contents of Na, Ca and S in the end product.

In contrast, the process according to the invention is carried out with the pH value being adjusted to less than 6.8, preferably to 6.0 to 6.7. By this means a considerably more effective washing of the precipitate is achieved and hence the impurity content is definitely lowered. However, precipitation at a pH value of less than 6.8 is inconsistent with the requirement that the Co ions be completely reacted. The reaction solution flowing off is still pink-coloured, that is, it contains considerable quantities of unreacted Co ions, which would also enter the waste water. This portends on the one hand environmental problems and on the other hand, because of the high price of Co raw materials, an indefensible economic loss. In the process according to the invention, the precipitation is nevertheless carried out at a pH of less than 6.8. The grave disadvantages of this condition for the precipitation are avoided according to the invention by recirculating the cobalt contained in the reaction solution flowing off and by adding it to the CoCl$_2$ solution prior to the reaction, if necessary with readjustment to a suitable pH value. There are a large number of feasible technical procedures which can be carried out in order to separate off cobalt as a sparingly soluble compound. These include:

precipitation of the cobalt as cobalt hydroxide by the addition of sodium hydroxide precipitation of the cobalt as basic cobalt hydroxide by alkaline oxidation with hydrogen peroxide precipitation of the cobalt as cobalt carbonate by the addition of alkali carbonates and/or alkaline earth carbonates or the respective hydrogen carbonates at suitable pH values precipitation of the cobalt as basic cobalt carbonate by the blowing in of carbon dioxide.

By carrying out the precipitation according to the invention, the formation of a precipitate containing a particularly fine-grained cobalt is ensured. Measurements taken by means of the Malvern Master Sizer instrument on samples withdrawn from the precipitate-containing suspension showed that the $D_{90}$ value is at most 90 μm, particularly preferably at most 40 μm. If the precipitations are carried out as in the known prior art, the $d_{90}$ value is 130 μm.

The reaction product is advantageously washed with water until the required purity is attained. Washing is carried out preferably in several stages, with the water temperatures selected being first of all in the range of from 0° C. to 35° C. and finally in the range of from 35° C. up to boiling temperature. The cobalt carbonate is then dried, preferably in a moving bed. Finally the product is converted to cobalt oxide. The latter is reduced, preferably using hydrogen, to ultrafine, very pure cobalt metal powder.

It is particularly preferred that between the drying and reducing stages a calcination be carried out at temperatures of from 500° C. to 800° C. The actual reduction is advantageously carried out at temperatures of between 400° C. and 550° C.

The present invention also provides the use of the cobalt metal powder according to the invention as a binding material for diamond tools, hard metals and abrasive component parts.

This invention further provides the use of the cobalt carbonate obtainable by the process according to the invention for the production of cobalt oxide of the general formula $CoO_{1-x}$ for use in batteries. This cobalt carbonate is also eminently suitable as a doping agent for electroceramics.

The invention is illustrated below by the following non-limiting Examples.

EXAMPLE 1

2 split streams (a) and (b) below were reacted in a continuous operation in a stirred-tank reactor to produce a suspended precipitate (suspension):

a) a cobalt chloride solution (concentration of the Co ions 105 g/l) having a volumetric flow rate of 4.3 l/h and b) a sodium hydrogen carbonate solution (concentration 90 g/l) having a volumetric flow rate of 14.3 l/h. A pH value of 6.5 was measured in the reaction suspension flowing out and a $d_{90}$ value of 38 μm, measured using a Malvern Master Sizer, was determined for the suspended precipitate. The suspension was filtered. The filtrate, which still contained cobalt, was treated with sodium hydroxide. The cobalt hydroxide precipitated and was filtered off and was dissolved in HCl and added to the reaction solution (a). The filtration residue from the reaction suspension was washed in portions, first of all nine times with cold water at 28° C., subsequently with hot water at a temperature of 76° C. After the product had been dried at 580° C. in a spray dryer, it was decomposed at 520° C. to cobalt oxide which then, under hydrogen at 490° C., was reduced to cobalt metal powder. It was possible to obtain a cobalt metal powder having a particle size of 0.88 μm, measured by the Fisher Sub Sieve Method.

A chemical analysis of the metal yielded the following impurities:

Na: 30 ppm

Ca: 10 ppm

S: <10 ppm

EXAMPLE 2

2 split streams (a) and (b) below were reacted in a continuous operation in a static mixer to produce a suspension:

a) a cobalt chloride solution (concentration of the Co ions 82 g/l) having a volumetric flow rate of 3.8 l/h and b) an ammonium hydrogen carbonate solution (concentration 101.7 g/l) having a volumetric flow rate of 8.9 l/h. A pH value of 6.4 was measured in the suspension flowing out and a $d_{90}$ value of 37 μm, measured using a Malvern Master Sizer, was determined for the suspended precipitate. The reaction suspension was filtered. The filtrate, which still contained cobalt, was treated with magnesium carbonate. The cobalt carbonate precipitated and was filtered off and was dissolved in HCl and added to the reaction solution a). The filtration residue from the reaction suspension was washed in portions, first of all with ice water, subsequently with hot water at a temperature of 67° C. After the product had been dried at 590° C., it was decomposed at 600° C. to cobalt oxide which then, under hydrogen at 500° C., was reduced to cobalt metal powder. It was possible to obtain a cobalt metal powder having a particle size of 0.90 μm, measured by the Fisher Sub Sieve Method.

A chemical analysis of the metal yielded the following impurities:

Na: 35 ppm

Ca: 8 ppm

S: <10 ppm

EXAMPLE 3

2 split streams (a) and (b) below were reacted in a continuous operation in a packed column to produce a suspension:

a) a cobalt chloride solution having a volumetric flow rate of 43.2 l/h (concentration of the Co ions 98 g/l) and b) a sodium hydrogen carbonate solution (concentration 92 g/l) having a volumetric flow rate of 155 l/h. A pH value of 6.6 was measured in the reaction suspension flowing out and a $d_{90}$ value of 40 μm, measured using a Malvern Master Sizer, was determined for the suspended precipitate. The reaction suspension was filtered. The filtrate, which still contained cobalt, was treated with sodium carbonate. The cobalt hydroxide precipitated and filtered off was added in portions to the reaction solution a). The filtration residue from the reaction suspension was washed in portions, first of all with cold water, subsequently with hot water at a temperature of 83° C. After the product had been dried at 560° C., it was decomposed at 680° C. to cobalt oxide which then, under hydrogen at 460° C., was reduced to cobalt metal powder. It was possible to obtain a cobalt metal powder having a particle size of 0.93 μm, measured by the Fisher Sub Sieve Method.

A chemical analysis of the metal yielded the following impurities:

Na: 36 ppm

Ca: 9 ppm

S: 11 ppm

The foregoing is graphically illustrated in the single figure of drawing showing initial feed streams of components for the initial reactor, namely, (a) liquefied cobalt chloride in solution or suspension form with adjustment of it directly or by a separate pH adjusting fluid (acidic) to establish a pH under 6.8 in the initial reactor. As mentioned above, this is entirely contrary to industry practice and expectation for reasons stated above. The initial reactor, which can be of a batch or continuous flow type, produces a muddy precipitate that is filtered to yield a filtrate with cobalt ions and a solid residue that is washed and dried as described above, then decomposed to produce cobalt-oxide, which is in turn reduced by added hydrogen or other reducing agent to produce a high purity, ultrafine cobalt powder. While this purified and sized cobalt powder is the principal end product (1), other possible off-takes from the process are useful per se, e.g. cobalt oxide (2) useful in battery electrodes; and cobalt carbonate (3) useful as a dopant for electro-ceramics. Reference is made to certain U.S. patents and copending patent applications of common assignment with this application showing how these cobalt carbonate and cobalt oxide products may be used:

Copending application 08/529,953 filed Sept. 18, 1995 (Krynitz et al/H. C. Starck GmbH & Co. KG) as a continuation of 08/279,948 filed Jul. 25, 1994, shows the utility of cobalt metal powder cobalt oxide, cobalt hydroxide and/or $Co_x(CoO)_{1-x}$ as active constituents of nickel electrodes in nickel/cadmium and nickel/metal hydride secondary batteries. See also, references cited therein at pp. 1–3 and the corresponding published European patent application of Starck, 94-111967.9 filed Jan. 4, 1995 and references cited in the search report published therewith.

Electro-ceramics include perovskite structure compounds of the general formula $X (B'B'')O_3$ where X can be, inter alia, lead (Pb), B'' is Ta or Nb and B' can be inter alia, cobalt (Co). Ta and Nb can be provided as relatively phase pure tantalates and niobates, i.e. B' (II)B''206 or B' (III) B' 204. Cobalt as a B' choice can be provided in -II or -III valence states and can be incorporated as cobalt oxide, cobalt carbonate or cobalt carbonate hydroxide. The preparation of the niobates and tantalates is shown in the copending U.S. application Ser. No. 08/535,847 of Reichert et al. and 08/390,232 of Reichert et al, both of common assignment with this application and references cited in the specifications of said applications. See, also, U.S. Pat. No. 5,288,474 granted to Reichert et al. and references cited therein.

Coming back to the filtrate of product from the initial reactor, the filtrate can be fed to a secondary reactor and then combined with alkali (e.g. sodium) hydroxide, alkali carbonate or alkaline earth (e.g. magnesium) carbonate to produce an output wet mass with a filterable precipitate (cobalt hydroxide) therein. This mass, a useful product per (4) can be filtered to produce a spongy cobalt hydroxide that can be recovered in several ways:

(I) reaction with NaOH to produce cobalt hydroxide (4')

(II) reaction with hydrogen peroxide to produce a basic cobalt hydroxide (4')

(III) reaction with a carbonate to produce cobalt carbonate (IV) reaction with carbon dioxide to produce a basic cobalt carbonate (3")

(V) dissolution in hydrochloric acid to produce a cobalt chloride solution that can be fed back to feed stream (a).

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. A process for the production of an ultrafine cobalt metal powder comprising fine crystallites, wherein the crystallites exhibit a rice-grain shaped to spherical habit and more than 90 wt-% of the crystallites have a diameter in the range of from 0.5 µm to 2 µm, and wherein the powder has (i) a sodium content of less than 100 ppm and a carbon content of less than 500 ppm or (ii) a sodium content of less than 50 ppm and contents of calcium and sulfur respectively of less than 30 ppm, the process comprising:

(a) reacting a soluble cobalt salt with a solution and/or a suspension of a material selected from the group consisting of alkali carbonate, alkaline-earth carbonate, cobalt carbonate, ammonium carbonate and the respective hydrogen carbonates of the foregoing, in the pH range of from 5.5 to 6.8 to form a cobalt carbonate precipitate, (b) separating off the precipitate formed, washing with water until the required purity is attained and dried, and (c) reducing the cobalt carbonate thus obtained to the cobalt metal powder.

2. The process according to claim 1, wherein the reaction is carried out at a temperature below 35° C.

3. The process according to claim 1, wherein the washing is carried out in several stages, with the water temperature selected in a first series of washing stages to be in the range of 0° C. to 35° C. and in a second series of washing stages in the range of from 35° C. up to boiling temperature.

4. The process according to claim 1, wherein the drying is carried out in a moving bed.

5. The process according to claim 4, wherein between the drying and the reduction, a calcination is carried out at a temperature of from 500° C. to 800° C.

6. The process according to claim 1, wherein between the drying and the reduction, a calcination is carried out at a temperature of from 500° C. to 800° C.

7. The process according to claim 6, wherein the reduction is carried out at a temperature ranging between 400° C. and 550° C.

8. The process according to claim 1, wherein the reduction is carried out at a temperature of between 400° C. and 550° C.

* * * * *